(12) United States Patent
Katano et al.

(10) Patent No.: US 7,885,515 B2
(45) Date of Patent: Feb. 8, 2011

(54) RECORDING/REPRODUCING DEVICE AND RECORDING/REPRODUCTION METHOD

(75) Inventors: Yuichi Katano, Hitachinaka (JP); Keiji Nagayama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1059 days.

(21) Appl. No.: 10/408,310

(22) Filed: Apr. 8, 2003

(65) Prior Publication Data

US 2004/0126083 A1    Jul. 1, 2004

(30) Foreign Application Priority Data

Dec. 26, 2002   (JP) ............................. 2002-375850

(51) Int. Cl.
*H04N 9/88* (2006.01)
(52) U.S. Cl. ................. 386/248; 348/231.4; 348/231.8; 348/231.9
(58) Field of Classification Search .................. 386/45, 386/69, 70, 117, 120, 125, 126, 95
See application file for complete search history.

(56) References Cited

U.S. PATENT DOCUMENTS

| | | | | |
|---|---|---|---|---|
| 6,411,771 | B1 * | 6/2002 | Aotake .................... | 386/52 |
| 2001/0026263 | A1 | 10/2001 | Kanamori et al. | |
| 2002/0035620 | A1 * | 3/2002 | Takahashi et al. .......... | 709/220 |

FOREIGN PATENT DOCUMENTS

| | | |
|---|---|---|
| JP | 05-066742 | 3/1993 |
| JP | 9-44984 | 2/1997 |
| JP | 09-044984 | 2/1997 |
| JP | 2001-177793 | 6/2001 |
| JP | 2001-268508 | 9/2001 |
| JP | 2001-325056 | 11/2001 |
| JP | 2001-344054 | 12/2001 |
| JP | 2002-112085 | 4/2002 |
| JP | 2002-118806 | 4/2002 |
| JP | 2002-216347 | 8/2002 |
| JP | 2002-325213 | 11/2002 |

OTHER PUBLICATIONS

Japanese Office Action issued in Japanese Patent Application No. JP 2008-179703 dated Sep. 1, 2009.
Japanese Office Action, issued in Japanese Patent Application No. JP 2005-000025 dated on May 13, 2008.
Japanese Office Action issued in Patent Application No. JP 2005-000025 dated on Aug. 19, 2008.

* cited by examiner

*Primary Examiner*—Thai Tran
*Assistant Examiner*—Daniel Tekle
(74) *Attorney, Agent, or Firm*—McDermott Will & Emery LLP

(57) ABSTRACT

In a recording/reproduction device, a type of recording medium which is currently selected is shown to the user on its small built-in monitor screen in a user-friendly manner and, for more user convenience, a background color of the screen is changed depending on the type of recording medium selected by the user. The user can know the currently selected type of recording medium from the screen's background color so it is possible to identify very quickly the type of recording medium even on a small monitor screen.

2 Claims, 5 Drawing Sheets

RECORDING/REPRODUCING DEVICE AND RECORDING/REPRODUCTION METHOD

BACKGROUND OF THE INVENTION

The present invention relates to a recording/reproduction technique for recording data on a recording medium or reproducing data from a recording medium, and more particularly to a technique which makes a display depending on the type of recording medium selected by a user for recording or reproduction Currently, there are recording/reproduction devices in which various types of recording media such as optical disks, including DVD-RAM (Digital Versatile Disc-Random Access Memory) and DVD-R (Digital Versatile Disc-Recordable), card type recording media based on semiconductor memories, hard disks and tape can be loaded at a time and data such as moving or still images is recorded or reproduced. These recording/reproduction devices use different types of recording media to make the different features of the different types of recording media complement each other.

One example is a camcorder or video camera which uses two types of recording media (card type recording medium and tape). A card type recording medium is compact and lightweight. When it is inserted directly into a PC, data on it can be loaded into the PC. Thus, the data can be used easily with the PC. However, since its recording capacity is small, it is suitable only for recording still images whose data volumes are usually smaller than those of moving images. Although it can record moving images, it is impossible to record moving images for a long time.

On the other hand, tape cannot be directly inserted into a PC and thus makes it more difficult to use the data recorded thereon with the PC than a card type recording medium. However, its recording capacity is large and thus suitable for many hours of videotaping.

In other words, in the abovementioned type of camcorder, tape is used as a recording medium to record moving images for many hours and a card type recording medium is used to load captured images as data into the PC. In this way, the features of the different types of recording media complement each other. Therefore, a camcorder which uses more than one type of recording medium is more convenient than one which uses only one type of recording medium.

Generally, recording/reproduction devices which use more than one type of recording medium have a switch to select a recording medium which the user is going to use for recording/reproduction of data. Usually, data can be recorded on, or reproduced from, only the recording medium selected by means of the switch; in order to use a recording medium not selected, the user has to select the recording medium using the switch.

JP-A No. 216347/2002 discloses a conventional technique concerning a recording/reproduction device which uses plural types of recording media and shows an icon on its display to inform the user of the type of recording medium currently selected.

JP-A Hei 9-44984 discloses a conventional technique concerning a recording/reproduction device which uses plural types of recording media and shows letters which have a color corresponding to the type of recording medium currently selected on its display to inform the user of the type of recording medium currently selected.

In a recording/reproduction device with a function which permits data to be recorded on, or reproduced from, more than one type of recording medium, the available recording/reproduction function considerably differs depending on the type of recording medium selected by the user, so it is very important to notify the user of which recording medium is currently selected.

However, the abovementioned conventional technique has the following drawback: an icon and/or plural letters, which appears somewhere on the monitor screen, is used to identify the type of recording medium, which means that in the case of a camcorder which usually has a small monitor screen of at most 3.5 inch as a display means, the user has to look for the icon, which has a size of at most 36×24 dots, and/or plural letters, which have a size of at most 18×12 dots, on the small screen of at most 3.5 inch and determine the type of recording medium from the shape of the icon. The visibility of the icon is low and it is difficult to identify the type of recording medium selected by the user quickly.

SUMMARY OF THE INVENTION

The primary object of the present invention is to provide a recording/reproduction technique which provides more convenience for the user by indicating the type of recording medium selected by the user in a way for the user to identify more easily.

With an aim at solving the problem, one aspect of the present invention resides in a technique for recording data on, or reproducing data, from plural types of recording media loaded whereby one recording medium is selected among the plural types of recording media loaded and a color corresponding to the selected type of recording medium is shown on display means.

According to another aspect of the invention, it is preferable to display, on display means, a thumbnail screen which shows plural thumbnails, as still or moving images in reduced form, in an orderly manner and has a background color corresponding to the type of recording medium selected.

According to still another aspect of the invention, it is more preferable that the plural types of recording media include an optical disk and a card type recording medium.

BRIEF DESCRIPTION OF THE DRAWINGS

The invention will be more particularly described with reference to the accompanying drawings, in which.

DESCRIPTION OF THE PREFERRED EMBODIMENTS

Next, an optical disk recording/reproduction camera (hereinafter called the "camera") with a card type recording medium loaded, which uses two types of recording media, an optical disk and a card type recording medium, as an embodiment of the present invention, will be described referring to FIGS. 1 to 6. In this embodiment, a semiconductor memory is used for a card type recording medium (hereinafter called the "card"). Also, the embodiment uses both DVD-RAM as a rewritable optical disk and DVD-R, as a write once type optical disk. It can also be used for video playing with DVD as an optical disk which is designed exclusively for reproduction.

In this embodiment, a screen which shows plural thumbnails of image data recorded on each recording medium together with various information is referred to as a navigation screen. Here, a thumbnail is a reduced form of moving or still image. This navigation screen is a representative screen in the reproduction mode for each type of recording medium so that when the background color of the navigation screen changes depending on the type of recording medium, the user can easily know for which type of recording medium the current reproduction mode is. For this reason, it is desirable to use quite different colors for the backgrounds of the navigation screens for the two types of recording media in order to help the user discriminate one type from the other. The embodiment uses purple as the background color of the navigation screen which appears when the optical disk is selected, and green as the background color of the navigation screen which appears when the card is selected.

Figure 1:
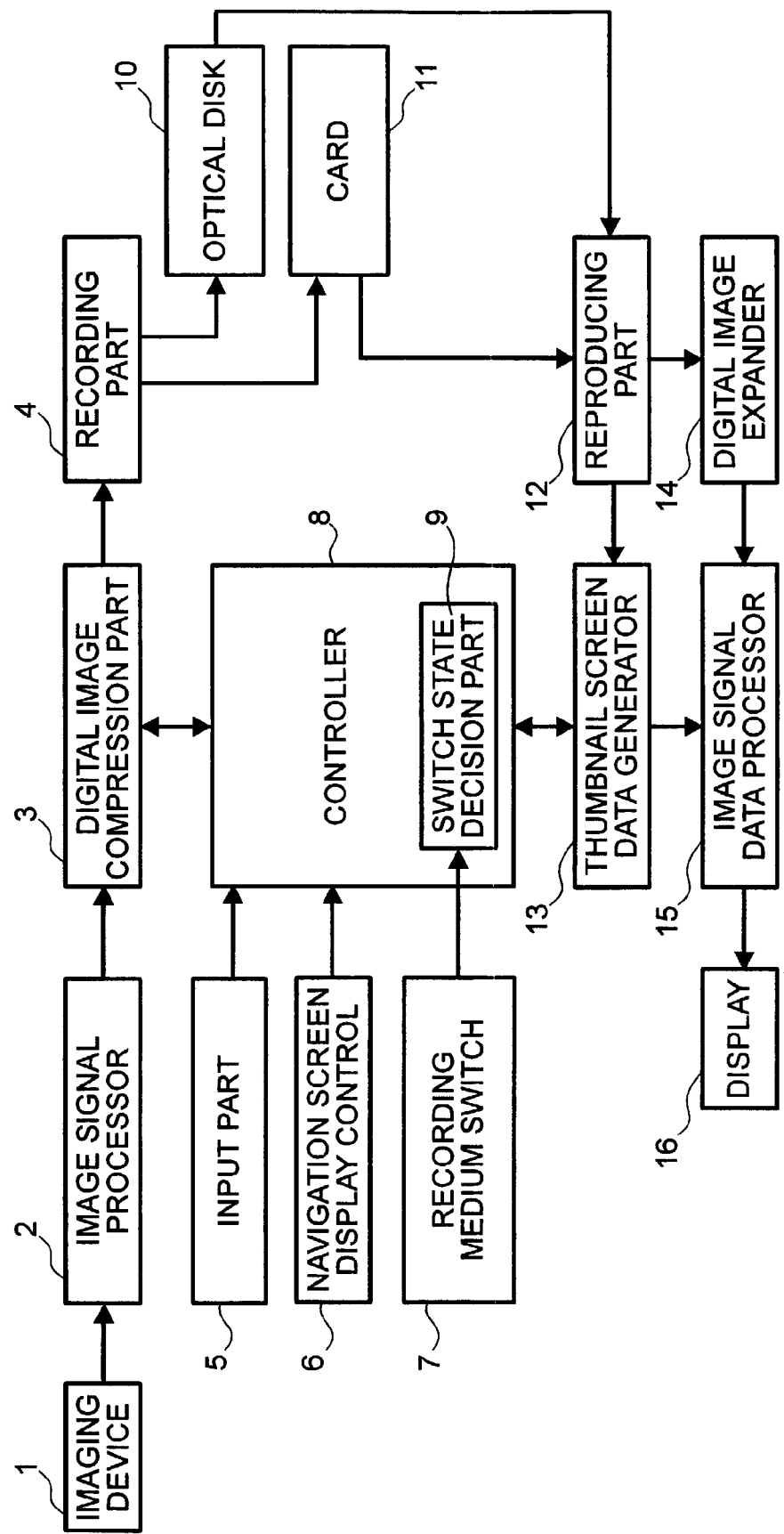
FIG. 1 shows the structure of an optical disk recording/reproduction camera with a card type recording medium loaded therein according to an embodiment of the present invention.

Referring to FIG. 1, an imaging device 1 converts an image into an image signal. An image signal processor 2 converts the image signal from the imaging device 1 into a digital signal and performs various signal processing tasks. A digital image compression part 3 generates compressed data of the digital signal. A recording part 4 records the compressed data and other various data on recording medium 10 or 11 which will be explained later. An input part 5, which consists of buttons or the like, is used to do various input operations for recording to, or reproduction from, the recording medium 10 or 11. A navigation screen display control 6, which consists of buttons or the like, is used to display a navigation screen. A recording medium switch 7, which consists of a switch or the like, is used to select the recording medium 10 or 11 and also serves as a power ON/OFF switch. A controller 8, which consists of a CPU, presets the display color for each type of recording medium, generates a screen display signal to change the display color depending on the type of recording medium, and also controls the entire camera. A switch state decision part 9, which is part of the controller 8, decides which recording medium is currently selected by the recording medium switch 7.

An optical disk 10 and a card 11 are easily attachable and detachable recording media. A reproducing part 12 reproduces image data recorded on the optical disk 10 or card 11, various recognition information and management information. A thumbnail screen data generator 13 extracts thumbnail data from the image data on the optical disk 10 or card 11 obtained by the reproducing part 12 or various information and generates data for listing of thumbnails. A digital image expander 14 expands the compressed image data on the optical disk 10 or card 11. An image signal data processor 15 converts the expanded data from the digital image expander 14 and/or data from the thumbnail screen data generator 13 into an analog signal and performs various signal processing tasks to generate a navigation screen.

A display 16, which is a monitor or the like, displays the analog-converted expanded data and the generated navigation screen. Here, it is also possible to use an external display device separate from the camera as the display 16. Furthermore, for getting much advantage of this invention, it is useful that a size of screen is at most 3.5 inch.

The image signal processor 2, digital signal compression part 3, digital image expander 14, image signal data processor 15, and thumbnail screen data generator 13 may consist of hardware circuits or a software program stored in the controller 8.

For recording compressed data and other various data on the optical disk or their reproduction from the optical disk 10, optical disk drives are used for the recording part 4 and reproducing part 12. For recording compressed data and other various data on the card or their reproduction from the card, circuits are used for the recording part 4 and reproducing part 12.

Next, a brief outline will be given of the processing sequence which is followed up to display of a navigation screen according to this embodiment when the user selects the card as the recording medium. When the user operates the recording medium switch 7 to select the card 11 with both the optical disk 10 and card 11 loaded, the switch state decision part 9 decides which recording medium is selected by the recording medium switch 7. As a result, it is found that the card 11 is selected.

Then, as the user operates the navigation screen display control 6 for the purpose of displaying a navigation screen, the controller 8 controls the camera as follows. If the various recognition data on the card 11 includes thumbnail data, the thumbnail screen data generator 13 generates thumbnail screen data for listing of thumbnails according to the thumbnail screen data reproduced by the reproducing part 12. If the various recognition data does not include thumbnail data, the reproducing part 12 reproduces the recorded image data and the thumbnail screen data generator 13 repeats a process to extract the first image of each image data file as many times as specified to generate thumbnail screen data for listing of thumbnails.

In this case, since the card 11 is selected as the recording medium, the background color of the navigation screen is green which is a color set for the card 11 by the thumbnail screen data generator 13. After that, the generated thumbnail screen data is converted into analog data by the image data processor 15 and combined with various information and a navigation screen with a green background is displayed on the display 16.

Therefore, the user can know at a glance without any icon as a card symbol on the navigation screen that the card 11 is currently selected as the recording medium, which makes the camera more user-friendly. In addition, since there is no need for an icon to be shown on the navigation screen, the display area which has been so far used for the icon may be used for other information instead or the size of displayed information other than the icon may be increased to improve its visibility for the user.

When the user selects the optical disk 10 as the external recording medium using the recording medium switch 7, purple is set as the background color of the navigation screen for the optical disk 10 by the thumbnail screen data generator 13 in the same manner as when the card 11 is selected.

Therefore, as in the case of the card 11, the user can know at a glance without any icon as an optical disk symbol on the navigation screen that the optical disk 10 is currently selected as the recording medium, which makes the camera more user-friendly.

After the above process, the user operates various buttons such as cursor buttons and a playback button in the input part 5 to specify desired images among those recorded on the recording medium currently selected by the recording medium switch, 7 so that the desired images are reproduced and displayed on the display 16.

Next, referring to FIG. 2, an explanation will be given of the processing sequence from selection of a recording medium to display of a navigation screen which is followed by the camera whose structure is shown in FIG. 1.

When at step 201 the optical disk 10 or card 11 is selected by means of the recording medium switch 7, at step 202 the switch state decision part 9 decides whether either the optical disk option or the card option is selected by the recording medium switch 7. When the optical disk 10 is selected, at step 203 the reproducing part 4 checks whether or not the optical disk 10 is loaded, the type of optical disk loaded and the remaining free memory space of the disk. If the optical disk 10 is decided to be an optical disk with which recording and reproduction are possible, at step 204 a through image as an image captured by the imaging device 1 (hereinafter called a "through image") is overlaid with specific information by the image signal data processor 15 and shown on-the display 16 and the camera enters the state of recording pause where recording is temporarily disallowed and the camera stands by for a user instruction. On the other hand, if it is decided at step 203 that recording and reproduction with the disk are impossible, then at step 207 a warning is shown on the display 16 to indicate that recording and reproduction are impossible.

After the pause-at step 204, the camera proceeds to step 212 where a decision is made as to whether or not the input part 5 or the navigation screen display control 6 has been operated. If it is decided that it has not been operated, the camera returns to step 204 and the recording pause is continued. If it has been operated, the camera proceeds to step 213 where the controller 8 decides whether the user has operated either the input part 5 for recording or the navigation screen display control 6 for a navigation screen.

If the user has operated the navigation screen display control 6, the camera proceeds to step 205 where a navigation screen with a purple background appears on the display 16. The process of generating a navigation screen is as described above. Though not shown in the flowchart, if the navigation screen display control (button) 6 is pressed again in this condition, the camera returns to the state of recording pause (step 204). On the other hand, if the input part (button) 5 has been operated for recording, the camera proceeds to step 206 where the recording part 4 records compressed data and other various data onto the optical disk 10.

Going back to step 202, if it is decided that the card 11 is selected, the camera proceeds to step 208 where the reproducing part 4 checks whether there is a card 11 loaded, how much free space for recording remains on the card 11, and the like. If it is decided that recording and reproduction with the card 11 are possible, then the camera proceeds to step 209 where a through image as captured by the imaging device 1 is overlaid with specific information and displayed on the display 16 and the camera enters the state of recording pause and stands by for a user instruction. On the other hand, if it is decided at step 208 that recording and reproduction with the card are impossible, then at step 207 a warning is displayed to indicate that recording and reproduction are impossible.

After the pause at step 209, a decision is made at step 214 as to whether or not the input part 5 or the navigation screen display control 6 has been operated. If it is decided that it has not been operated, the camera returns to step 209 and the recording pause is continued. If it has been operated, a decision is made as to whether the user has operated either the input part 5 for recording or the navigation screen display control 6 for a navigation screen. If the user has operated the navigation screen display control 6, the camera proceeds to step 210 where a navigation screen with a green background appears on the display 16. The process of generating a navigation screen is as described above. Though not shown in the flowchart, if the navigation screen display control (button) 6 is pressed again in this condition, the camera returns to the state of recording pause (step 209). On the other hand, if the input part 5 has been operated for recording, the camera proceeds to step 206 where the recording part 4 records compressed data and other various data onto the card 11.

The background color (purple) of the navigation screen for the optical disk which appears at step 205 is quite different from that (green) of the navigation screen for the card which appears at step 210, so the user can know at a glance for which recording medium the navigation screen is displayed.

In the case of display of a through image, an image captured by the imaging device 1 covers the whole screen of the display 16 with no background. Therefore, arrangements may be made so that at step 204, step 207 and step 209 where a through image is displayed, a mark or character which symbolizes the type of recording medium (optical disk 10 or card 11) is superimposed on the through image in accordance with the specific information combined with the through image data. Also it is possible that the display colors preset in the controller 8 are used in a way that the color of the mark, character or the like symbolizing the type of recording medium may be varied depending on the type of recording medium. This makes it possible to identify the type of recording medium selected easily even in the case of display of a through image, thereby contributing to increased user-friendliness. For a camera user in particular, it is important not to miss the chance to record. In this sense, it is convenient for the user to identify the type of recording medium easily.

Next, how the navigation screen differs depending on the type of recording medium selected according to the present invention will be explained referring to FIGS. 3 to 6.

Figure 2:
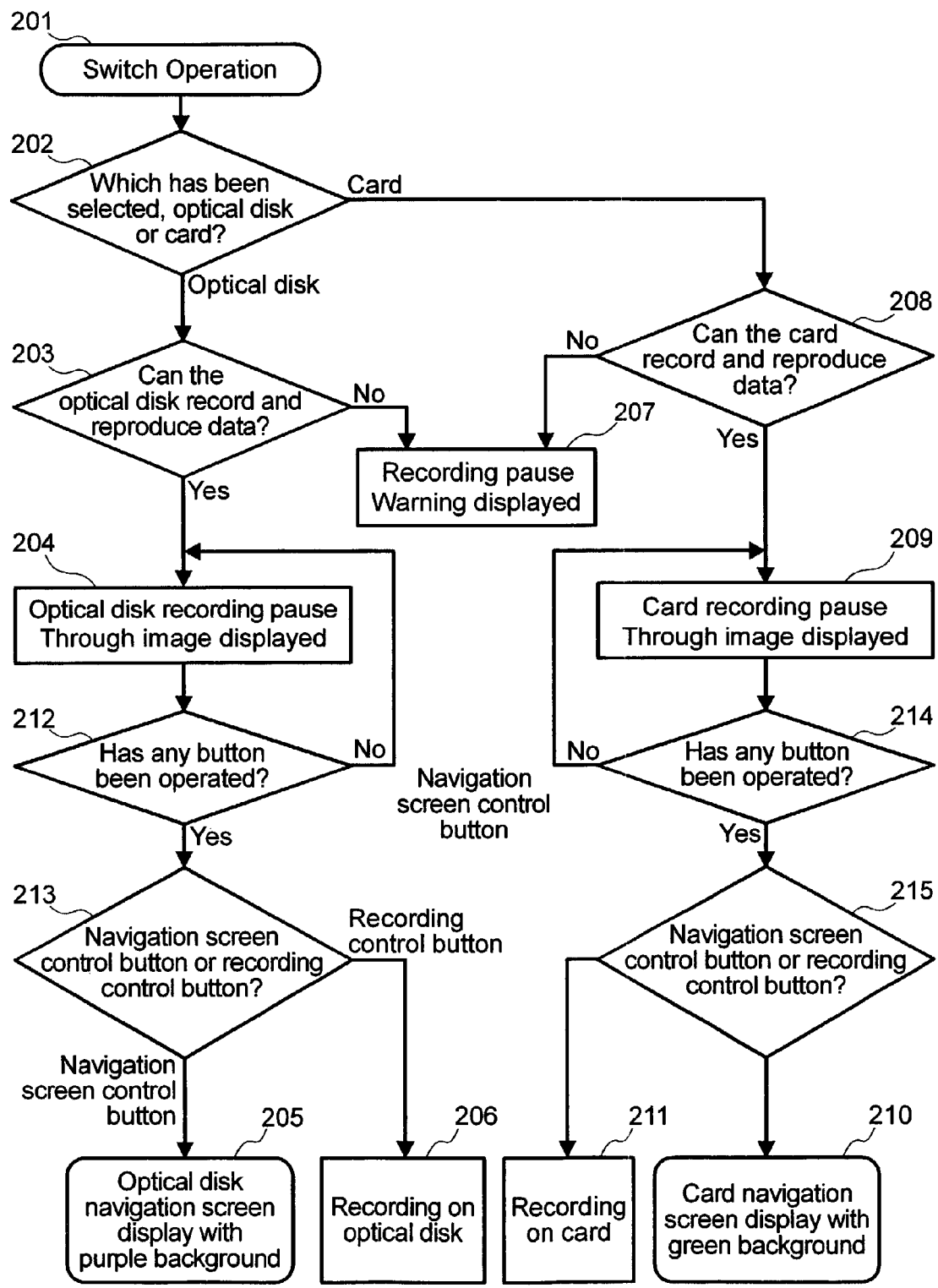
FIG. 2 is a flowchart showing the process from identification of the type of recording medium to display of a navigation screen according to the embodiment.
Figure 3:
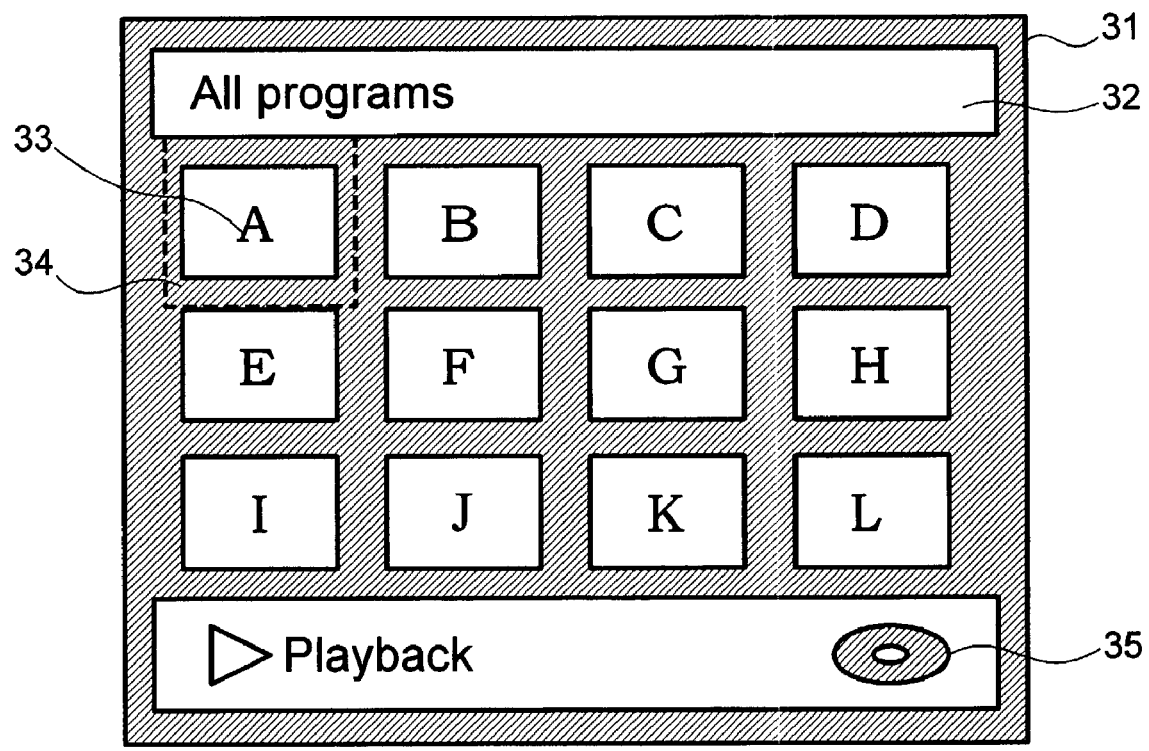
FIG. 3 shows a navigation screen as an example which appears when an optical disk is selected.

FIG. 3 shows a navigation screen which appears on the display 16 (step 205 in FIG. 2) when the optical disk 10 is selected as the recording medium. As shown in FIG. 3, a navigation screen 31 consists of a content list 32 which shows currently listed images or files; thumbnails 33 (in this example, 12 thumbnails, A through L); a cursor pointer 34 which highlights the selected thumbnail; and a mark 35 which symbolizes the selected recording medium type. On the navigation screen 31, the shaded area, or the remaining area except the content list 32, thumbnails 33 (12 thumbnails A through L in this example), cursor pointer 34 and mark 35 is the background.

In this case, from the decision made at step 202 in FIG. 2, it is known that the recording medium selected is an optical disk, so the background color of the navigation screen 31 is purple and the mark 35 which symbolizes the type of recording medium is a purple disk mark. However, the color of the mark 35 may be not purple but another color because the background color already indicates the type of recording medium.

Figure 4:
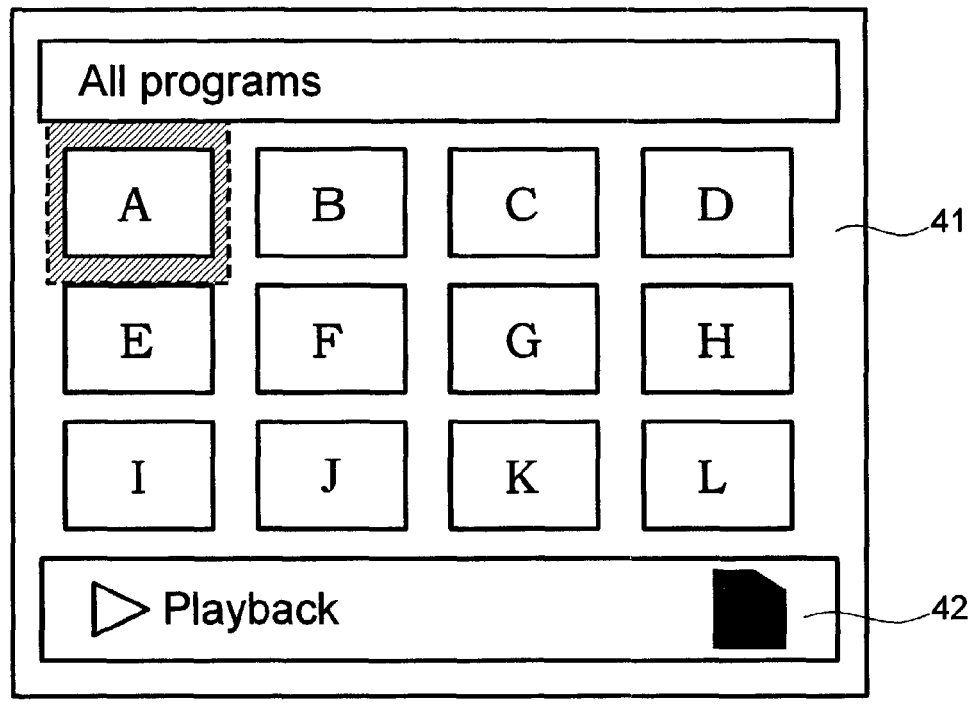
FIG. 4 shows a navigation screen as an example which appears when a card type recording medium is selected.

FIG. 4 shows a navigation screen which appears on the display 16 (step 210 in FIG. 2) when the card 11 is selected as the recording medium. In this case, from the decision made at step 202 in FIG. 2, it is known that the recording medium selected is a card 11, so the background color of the navigation screen 41 is green and the mark 42 which symbolizes the type of recording medium is a green card mark in this embodiment. However, the color of the mark 35 may be not green but another color because the background color already indicates the type of recording medium.

As can be seen from FIG. 3, and FIG. 4, the navigation screen background color largely differs depending on the type of recording medium. Consequently, when a small monitor as usually used in a camcorder is used as the display 16 for a navigation screen, the user can know the type of recording medium selected from the background color more easily and quickly than when he/she must know the type of recording medium from an icon only on the small navigation screen.

Next, referring to FIG. 5 and FIG. 6, an explanation will be given of examples of warnings which appear on the display 16 at step 207 (FIG. 2) when it is decided at step 203 or 208 (FIG. 2) that recording on the optical disk or card is impossible.

Figure 5:
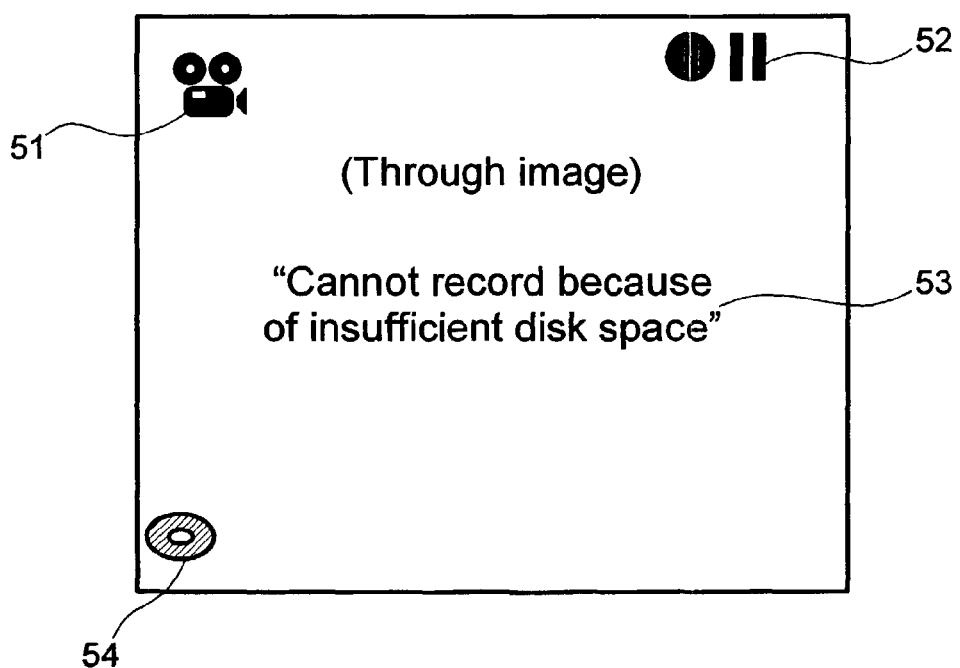
FIG. 5 shows a screen as an example which appears after an optical disk whose remaining free memory space is insufficient is loaded.

FIG. 5 shows a warning screen which appears when it is decided at step 203 that the remaining free space of the disk is insufficient and recording is impossible. A warning 53, "Cannot record because of insufficient disk space" is given to the user. At the same time, a purple disk mark is displayed to indicate that the optical disk is selected as a type mark 54 of the recording medium. On this screen, a mode mark 51 indicates that the camera is in the recording mode and a state mark 52 indicates that the camera is in the state of recording pause. When data recording is underway, the warning 53 does not appear but the state mark 52 is replaced by another type of mark.

Figure 6:
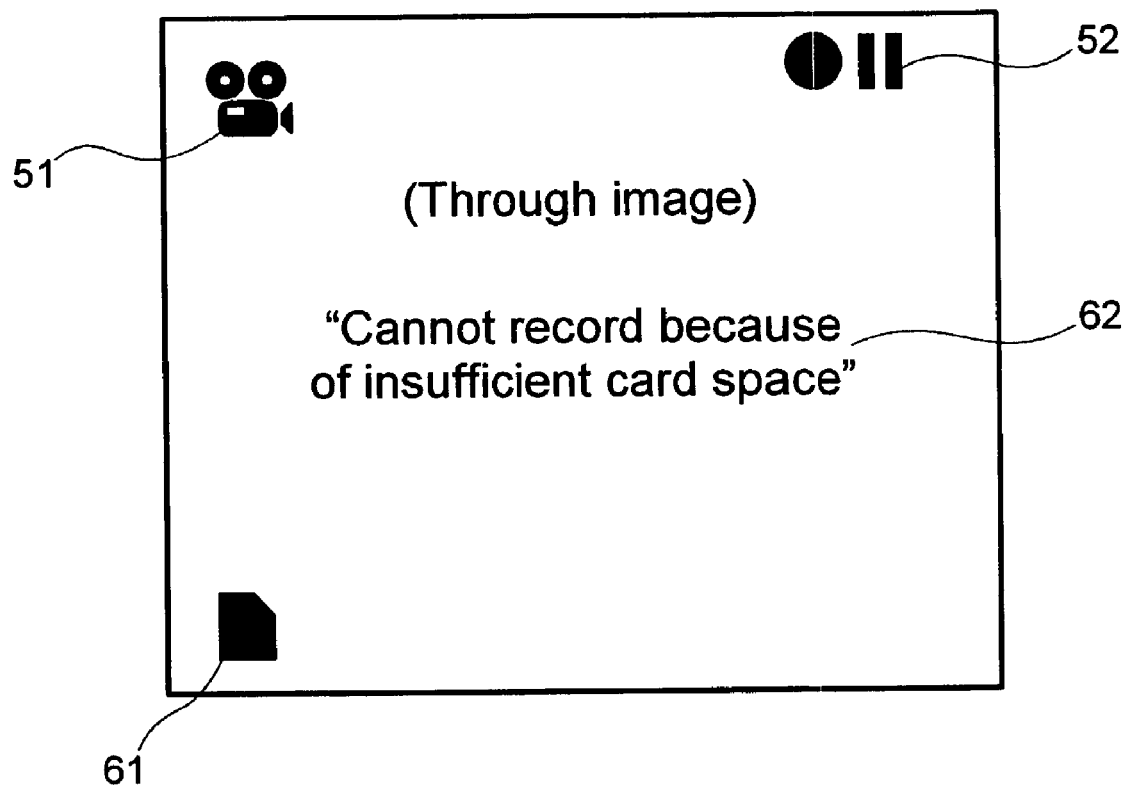
FIG. 6 shows a screen as an example which appears after a card whose remaining free memory space is insufficient is loaded.

FIG. 6 shows a warning screen which appears when it is decided at step 208 that the remaining card space is insufficient and recording is impossible. A warning, "Cannot record because of insufficient card space" is given to the user. At the same time, a green card mark 61 is displayed to indicate that the card is selected as a type mark of the recording medium. Other marks on the screen are the same as those shown in FIG. 5 and their description is omitted here.

In FIG. 5 and FIG. 6, a warning may be shown in the color depending on the type of recording medium instead of the disk or card mark. Alternatively, the type of recording medium may be indicated by the color of a through image instead of the color of the warning or mark.

Since the type of recording medium can be easily identified even by a through image, the type of recording medium selected can be identified not only in the reproduction mode (on the navigation screen) but also in the recording mode. This also provides more convenience for the user.

In this embodiment, the background color of a navigation screen as a representative screen in the reproduction mode is used to identify the type of recording medium. However, the color of a mark or character on the screen which symbolizes the type of recording medium may also be used in the recording mode or other screen modes to identify the type of recording medium.

Although this embodiment uses purple for the optical disk and green for the card as the navigation screen background colors, any other color combination may be used.

This embodiment assumes that different types of recording medium, an optical disk and a card, are loadable and provides a method for the user to discriminate between them by the navigation screen background color. However, the method of indentifying the recording medium type using different colors on the screen may also be used for any other combination of recording media (for example, a hard disk and an internal memory). Furthermore, discrimination between different types of optical disks (for example, rewritable optical disk DVD-RAM and write-once optical disk DVD-R) may be done by colors on the screen.

The above-described processing sequence up to display of a navigation screen is just one example and not limited thereto.

In the explanation of this embodiment made so far, reference has been made to optical disks such as DVD-RAM, DVD-R and DVD video. However, optical disks to which the present invention may be applied are not limited to them. For example, it may also be applied to other types of optical disks such as DVD-RW, CD-R and CD-RW.

This embodiment has been explained above by taking up a camcorder as an example of a recording/reproduction device. However, the scope of the present invention is not limited to camcorders. The present invention may be applied to any electronic device which enables recording and reproduction of data with more than one type of recording medium, without departing from the spirit of the invention.

The foregoing invention has been described in terms of preferred embodiments. However, those skilled in the art will recognize that many variations of such embodiments exist. Such variations are intended to be within the scope of the present invention and the appended claims.

The invention claimed is:

1. A portable camera which records image data on plural types of recording medium and reproduces image data from the plural types of recording medium, comprising:
   a selecting unit for selecting one recording medium from among the plural types of recording medium loaded,
   a recording unit for recording data on the one recording medium selected by the selecting unit,
   an input unit for receiving a user operation that indicates the reproduction mode;
   a reproducing unit for reproducing an image data from the recording medium in the reproduction mode, and
   an outputting unit for outputting a screen display signal, which shows a screen of a display that shows plural thumbnails of an image data in the reproduction mode and has a background color corresponding to the type of the recording medium selected by the selecting unit, a recording/reproduction function differing according to the type of the recording medium, to the display, when the user operation that indicates the reproduction mode is received by the input unit.

2. The portable camera as defined in claim 1, wherein the types of recording medium include an optical disk and a card type recording medium.

* * * * *